(12) United States Patent
Salokannel et al.

(10) Patent No.: US 9,445,222 B2
(45) Date of Patent: Sep. 13, 2016

(54) USING BLUETOOTH LOW ENERGY

(71) Applicant: Nokia Technologies Oy, Espoo (FI)

(72) Inventors: Juha Johannes Salokannel, Tampere (FI); Antti Paavo Tapani Kainulainen, Siilinjärvi (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/436,036

(22) PCT Filed: Oct. 30, 2012

(86) PCT No.: PCT/IB2012/056017
§ 371 (c)(1),
(2) Date: Apr. 15, 2015

(87) PCT Pub. No.: WO2014/068366
PCT Pub. Date: May 8, 2014

(65) Prior Publication Data
US 2015/0289082 A1     Oct. 8, 2015

(51) Int. Cl.
*H04B 7/00*     (2006.01)
*H04W 4/00*     (2009.01)
*H04W 4/20*     (2009.01)
*G01S 1/04*     (2006.01)
*G01S 1/24*     (2006.01)
*G01S 5/08*     (2006.01)
*H04W 52/02*    (2009.01)
*H04W 72/12*    (2009.01)

(52) U.S. Cl.
CPC .............. *H04W 4/008* (2013.01); *G01S 1/042* (2013.01); *G01S 1/24* (2013.01); *G01S 5/08* (2013.01); *H04W 4/20* (2013.01); *H04W 52/0261* (2013.01); *H04W 72/1263* (2013.01)

(58) Field of Classification Search
CPC ...... H04L 69/24; H04W 4/008; H04W 64/00
USPC ........................................................ 455/41.2
See application file for complete search history.

(56) References Cited

U.S. PATENT DOCUMENTS

| 8,965,284 B2 * | 2/2015 | Honkanen ................. G01S 3/46 455/41.1 |
| 2007/0097867 A1 | 5/2007 | Kneckt et al. |
| 2009/0201169 A1 | 8/2009 | D'Hont et al. |
| 2012/0253484 A1 | 10/2012 | Burich et al. |

FOREIGN PATENT DOCUMENTS

EP     2509343     10/2012

OTHER PUBLICATIONS

International Search Report received for corresponding Patent Cooperation Treaty Application No. PCT/IB2012/056017, dated Jun. 20, 2013, 13 pages.

* cited by examiner

*Primary Examiner* — Eugene Yun
(74) *Attorney, Agent, or Firm* — Locke Lord LLP

(57) ABSTRACT

A method comprises receiving a signal indicative of receipt of a first Bluetooth low energy message (42), the first Bluetooth low energy message (42) including at least one transmission time adjustment parameter, determining an adjusted transmission time for a subsequent Bluetooth low energy message (44) based on the at least one transmission time adjustment parameter, and causing transmission of the subsequent Bluetooth low energy message (44) at the adjusted transmission time.

14 Claims, 6 Drawing Sheets

USING BLUETOOTH LOW ENERGY

RELATED APPLICATION

This application was originally filed as PCT Application No. PCT/IB 2012/056017 filed Oct. 30, 2012.

Field

The invention relates to the use of Bluetooth low energy.

Background

It is useful to know the location of items or assets within a space. This may be for the purpose of, for example, keeping track of stock within a warehouse, determining a distance moved by an athlete during an event, or enabling a user to locate, and subsequently orientate, themselves.

Various systems for determining the location of items or assets are known in the art. These use a range of different technologies including GPS, RFID, radar and video analysis.

SUMMARY

In a first aspect, this specification describes a method comprising receiving a signal indicative of receipt of a first Bluetooth low energy message, the first Bluetooth low energy message including at least one transmission time adjustment parameter, determining an adjusted transmission time for a subsequent Bluetooth low energy message based on the at least one transmission time adjustment parameter, and causing transmission of the subsequent Bluetooth low energy message at the adjusted transmission time.

The method may comprise, prior to receiving the first Bluetooth low energy message, causing transmission of a second Bluetooth low energy message, the second message indicating a channel over which the subsequent message is to be transmitted.

The at least one transmission time adjustment parameter may comprise a transmission schedule adjustment parameter for indicating a duration by which the transmission time of the subsequent message should be adjusted from a scheduled transmission time. Determining the adjusted transmission time may comprise adjusting the scheduled transmission time by the duration indicated by the transmission schedule adjustment parameter.

The at least one transmission time adjustment parameter may comprise a transmission delay parameter for indicating a maximum duration by which transmission of the subsequent message may be delayed. Determining the transmission time for the subsequent Bluetooth low energy message may comprise using the transmission delay parameter to select a delay duration, and adjusting an initial transmission time for the subsequent message by the selected delay duration.

The subsequent message may comprise a positioning packet for allowing a position of a device, which transmits the subsequent message, to be determined.

The subsequent message may be a Bluetooth low energy broadcast message.

In a second aspect, this specification describes a method comprising determining at least one transmission time adjustment parameter, and causing transmission of a first Bluetooth low energy message including the at least one transmission time adjustment parameter, the at least one transmission time adjustment parameter being for allowing recipient apparatus to determine an adjusted transmission time for a subsequent Bluetooth low energy message, and enabling receipt of the subsequent message, the subsequent message having been transmitted by the recipient apparatus at the determined adjusted transmission time.

The method of the second aspect may comprise prior to determining the at least one transmission time adjustment parameter, receiving a second Bluetooth low energy message from the recipient apparatus, determining the at least one transmission time adjustment parameter based on a time of receipt of the second Bluetooth low energy message. The method may comprise prior to determining the at least one transmission time adjustment parameter, receiving a third Bluetooth low energy message from the recipient apparatus, and determining the at least one transmission time adjustment parameter based on a time of receipt of the second Bluetooth low energy message and on at least one of a time of receipt of the third Bluetooth low energy message and information included in the third Bluetooth low energy message.

In a third aspect, this specification describes apparatus comprising at least one processor and at least one non-transitory memory medium having computer-readable instructions stored thereon, the at least one memory medium and the computer-readable instructions configured, with the at least one processor, to cause the apparatus at least to receive a signal indicative of receipt of a first Bluetooth low energy message, the first Bluetooth low energy message including at least one transmission time adjustment parameter, to determine an adjusted transmission time for a subsequent Bluetooth low energy message based on the at least one transmission time adjustment parameter, and to cause transmission of the subsequent Bluetooth low energy message at the adjusted transmission time.

The at least one memory medium and the computer-readable instructions may be configured, with the at least one processor, to cause the apparatus prior to receiving the first Bluetooth low energy message, to cause transmission of a second Bluetooth low energy message, the second message indicating a channel over which the subsequent message is to be transmitted.

The at least one transmission time adjustment parameter may comprise a transmission schedule adjustment parameter for indicating a duration by which the transmission time of the subsequent message should be adjusted from a scheduled transmission time. The at least one memory medium and the computer-readable instructions may be configured, with the at least one processor, to cause the apparatus to determine the adjusted transmission time by adjusting the scheduled transmission time by the duration indicated by the transmission schedule adjustment parameter.

The at least one transmission time adjustment parameter may comprise a transmission delay parameter for indicating a maximum duration by which transmission of the subsequent message may be delayed. The at least one memory medium and the computer-readable instructions may be configured, with the at least one processor, to cause the apparatus to determine the transmission time for the subsequent Bluetooth low energy message by using the transmission delay parameter to select a delay duration, and adjusting an initial transmission time for the subsequent message by the selected delay duration.

The subsequent message may comprise a positioning packet for allowing a position of a device, which transmits the subsequent message, to be determined.

The subsequent message may be a Bluetooth low energy broadcast message.

In a fourth aspect, this specification describes apparatus comprising at least one processor and at least one non-transitory memory medium having computer-readable instructions stored thereon, the at least one memory medium and the computer-readable instructions configured, with the at least one processor, to cause the apparatus at least to determine at least one transmission time adjustment parameter, and to cause transmission of a first Bluetooth low energy message including the at least one transmission time adjustment parameter, the at least one transmission time adjustment parameter being for allowing recipient apparatus to determine an adjusted transmission time for a subsequent Bluetooth low energy message, and to enable receipt of the subsequent message, the subsequent message having been transmitted by the recipient apparatus at the determined adjusted transmission time.

The at least one memory medium and the computer-readable instructions of the fourth aspect may be configured, with the at least one processor, to cause the apparatus, prior to determining the at least one transmission time adjustment parameter, to receive a second Bluetooth low energy message from the recipient apparatus, and to determine the at least one transmission time adjustment parameter based on a time of receipt of the second Bluetooth low energy message.

The at least one memory medium and the computer-readable instructions of the fourth aspect may be configured with the at least one processor, to cause the apparatus prior to determining the at least one transmission time adjustment parameter, to receive a third Bluetooth low energy message from the recipient apparatus, and to determine the at least one transmission time adjustment parameter based on a time of receipt of the second Bluetooth low energy message and on at least one of a time of receipt of the third Bluetooth low energy message and information included in the third Bluetooth low energy message.

In a fifth aspect, this specification describes at least one non-transitory computer-readable memory medium having computer-readable code stored thereon, the computer-readable code being configured to cause computing apparatus to receive a signal indicative of receipt of a first Bluetooth low energy message, the first Bluetooth low energy message including at least one transmission time adjustment parameter, to determine an adjusted transmission time for a subsequent Bluetooth low energy message based on the at least one transmission time adjustment parameter, and to cause transmission of the subsequent Bluetooth low energy message at the adjusted transmission time.

In a sixth aspect, this specification describes at least one non-transitory computer-readable memory medium having computer-readable code stored thereon, the computer-readable code being configured, when executed by computing apparatus, to cause the computing apparatus to determine at least one transmission time adjustment parameter, and to cause transmission of a first Bluetooth low energy message including the at least one transmission time adjustment parameter, the at least one transmission time adjustment parameter being for allowing recipient apparatus to determine an adjusted transmission time for a subsequent Bluetooth low energy message, and to enable receipt of the subsequent message, the subsequent message having been transmitted by the recipient apparatus at the determined adjusted transmission time.

In a seventh aspect, this specification describes computer-readable instructions which, when executed by computing apparatus, cause the computing apparatus to perform a method according to either of the first and second aspects.

In an eighth aspect, this specification describes apparatus comprising means for receiving a signal indicative of receipt of a first Bluetooth low energy message, the first Bluetooth low energy message including at least one transmission time adjustment parameter, means for determining an adjusted transmission time for a subsequent Bluetooth low energy message based on the at least one transmission time adjustment parameter, and means for causing transmission of the subsequent Bluetooth low energy message at the adjusted transmission time.

In a ninth aspect, this specification describes apparatus comprising means for determining at least one transmission time adjustment parameter, means for causing transmission of a first Bluetooth low energy message including the at least one transmission time adjustment parameter, the at least one transmission time adjustment parameter being for allowing recipient apparatus to determine an adjusted transmission time for a subsequent Bluetooth low energy message, and means for enabling receipt of the subsequent message, the subsequent message having been transmitted by the recipient apparatus at the determined adjusted transmission time.

In a tenth aspect, this specification describes apparatus configured to receive a signal indicative of receipt of a first Bluetooth low energy message, the first Bluetooth low energy message including at least one transmission time adjustment parameter, to determine an adjusted transmission time for a subsequent Bluetooth low energy message based on the at least one transmission time adjustment parameter, and to cause transmission of the subsequent Bluetooth low energy message at the adjusted transmission time.

In an eleventh aspect, this specification describes apparatus configured to determine at least one transmission time adjustment parameter, and to cause transmission of a first Bluetooth low energy message including the at least one transmission time adjustment parameter, the at least one transmission time adjustment parameter being for allowing recipient apparatus to determine an adjusted transmission time for a subsequent Bluetooth low energy message, and to enable receipt of the subsequent message, the subsequent message having been transmitted by the recipient apparatus at the determined adjusted transmission time.

BRIEF DESCRIPTION OF THE FIGURES

For a more complete understanding of example embodiments, reference is now made to the following description taken in connection with the accompanying drawings in which.

DETAILED DESCRIPTION OF EXAMPLE EMBODIMENTS

Figure 1:
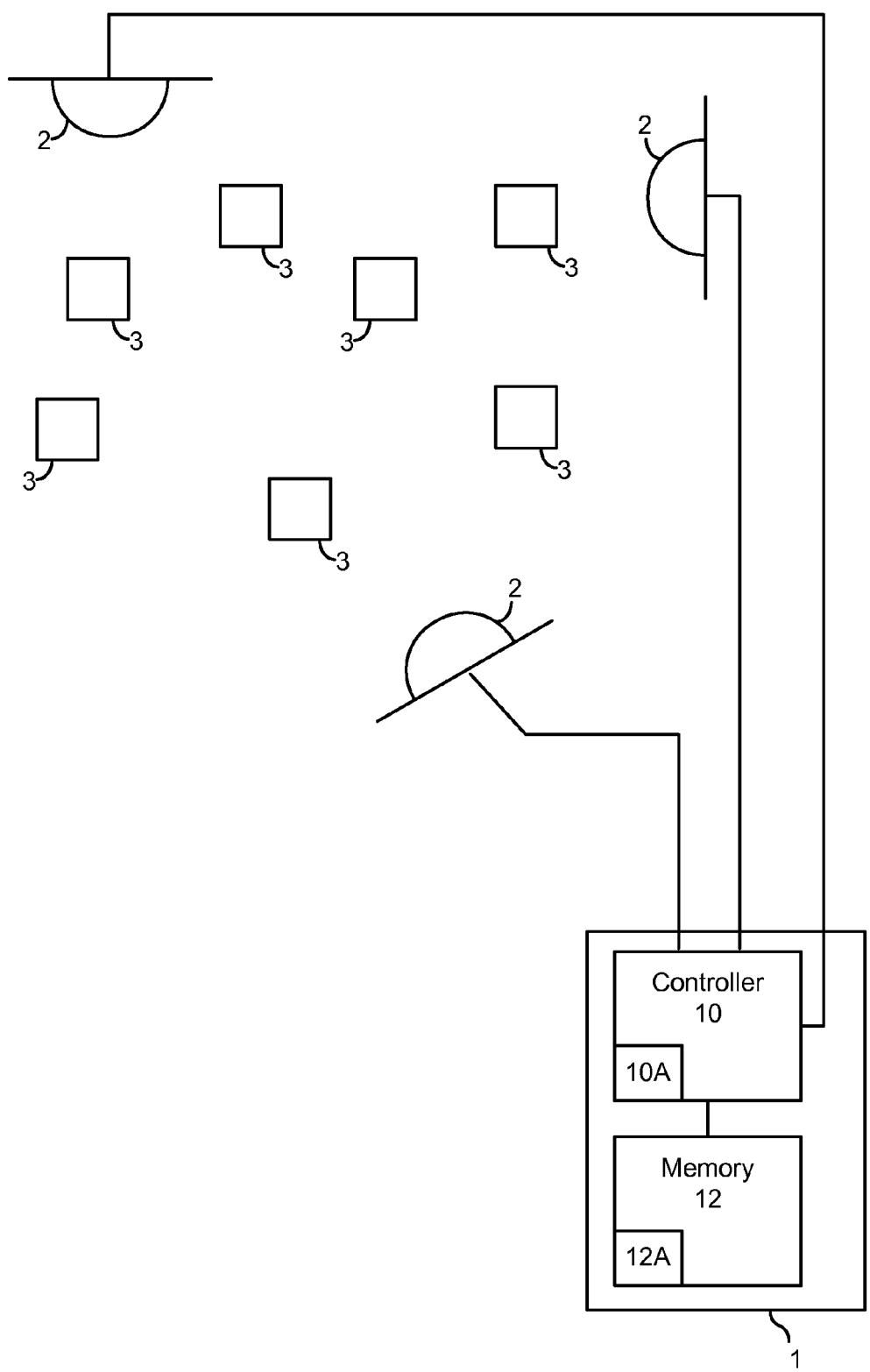
FIG. 1 is a schematic illustration of a system according to example embodiments.

In the description and drawings, like reference numerals refer to like elements throughout.

Positioning packets can be used to determine and track the position of a mobile device in any area provided with a suitable infrastructure. The mobile device may be, for instance, a location tag that is to be used for asset tracking. It may alternatively be a more complex device.

Positioning making use of positioning packets can be used to achieve accurate positioning indoors. Some systems may enable a resolution down to 30 cm. It may be based for instance on low cost Bluetooth Low Energy (BT LE) technology, which is a feature of the Bluetooth v4.0 standard.

A positioning system making use of periodic BT LE transmissions can be used with smart devices that locate themselves using a BT LE signal emitted by directional transceivers (DT). This may be referred to as "downlink" mode. DTs are also referred to as beacons. DTs are generally comprised of multiple antennas provided in an array. In downlink mode, the DT may transmit a signal sequentially using several antennas and the smart device receives this using a single antenna. The smart device can calculate its direction vector (or bearing) from the DT if it knows the DT antenna switching pattern of the transmitted signal and the DT antenna array calibration pattern.

Alternatively, a reversed mode of operation can be used. In this "asset tracking" or "uplink" mode, BT LE transceivers that are referred to as tags, or location tags, emit a signal that is picked up by one or more DTs. The signal is a data packet that enables a DT to identify the tag. The packet may be referred to as a positioning packet. The positioning packet has a form that allows the DT (or another device) to calculate the direction vector (bearing) from the DT towards the tag using a reception of the signal by multiple antennas of the DT. This process is also referred to as "tag update". An HDP (high definition positioning) infrastructure behind the DTs may calculate the position of the tag.

The position of the device may be calculated using the known location and orientation of one DT and a bearing to the tag from the DT, optionally with constraint information. Position may also be calculated based on the bearings determined by two, three or more DTs using triangulation. The HDP infrastructure may comprise to this end a positioning server that contains data buffering and position calculation functions.

Additionally, the HDP infrastructure may contain various management and application servers.

Location tags supporting "uplink" mode can be particularly small and inexpensive, and they may be attached to any desired moving object. A location tag may comprise for instance a battery, some logic in the form of a microcontroller, and radio parts. It may be configured to transmit periodically a signal in order to enable determination of positions of the tag. The positions may be used, for instance, for tracking an object to which the tag is associated. Typical frequencies of transmissions and thus of enabled location updates are 1, 10 or 50 times per second. Example embodiments as described herein typically make use of the uplink mode.

WO2009/056150 describes various positioning systems and methods, which may be similar to those described above.

FIG. 1 is a simplified schematic of a system according to example embodiments.

The system comprises data processing infrastructure 1, 2 and at least one mobile device 3. In this example, the system comprises plural mobile devices 3.

The data processing infrastructure 1, 2 comprises processing apparatus 1 and at least one transceiver 2. In examples in which the data processing infrastructure 1, 2 is configured to determine the location of the at least one mobile device 3, each of the at least one transceiver 2 may comprise a directional transceiver (DT) as described above. In such examples, the data processing infrastructure 1, 2 may be referred to as processing infrastructure. In the example of FIG. 1, plural transceivers 2 are in wired or wireless communication with a single control apparatus 1. In other examples, a control apparatus 1 may be provided for each transceiver 2. In these, examples, each of the control apparatuses 1 may be configured to communicate with each other, for example, via a central server.

The control apparatus 1 comprises a controller 10 and at least one non-transitory memory medium 12. The controller 10 is operable to perform operations under the control of computer-readable code 12A stored in the at least one memory 12. The controller 10 is operable to retrieve data from the memory 12 and also to store data therein. The controller 10 is operable also to cause the at least one transceiver 2 to transmit data packets to the at least one mobile device 3. Also, the controller 10 is operable to operate on, and extract data from, data packets which are received at the at least one transceiver 2 from the at least one mobile device 3. The data packets may be referred to as "messages". In some examples, at least some of the messages may comprise positioning packets for allowing the control apparatus 1 to determine the location of the mobile device 3 from which the positioning packet is received or to which the positioning packet is transmitted. In such examples, the controller 10 is operable under the control of the computer-readable code 12A to determine the location of the mobile device 3 based on positioning packets received from the device 3. Other functionality of the controller 10 will be understood from the below description of example embodiments.

Figure 2:
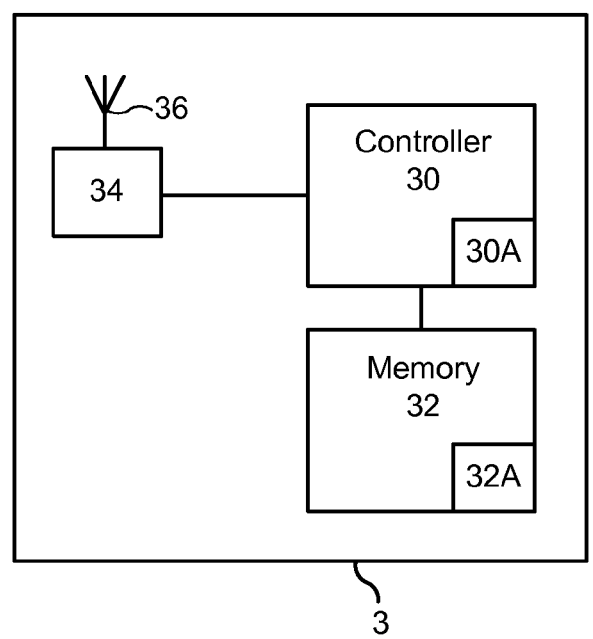
FIG. 2 is a schematic illustration of a device according to example embodiments.

FIG. 2 is a schematic illustration depicting one of the mobile devices 3 of FIG. 1. The mobile device 3 comprises processing apparatus 30, 32, a transceiver module 34 and an antenna 36. The processing apparatus 30, 32 comprises a controller 30 and at least one non-transitory memory 32. The controller 30 is operable to perform operations under the control of computer-readable code 32A stored in the at least one memory 32. The controller 30 is operable to retrieve data from the memory 12 and also to store data therein. The controller 30 is operable also to cause the transceiver module 34 to transmit messages to the at least one directional transceiver 2 of the data processing infrastructure 1, 2. Also, the controller 30 is operable to operate on, and extract data from, messages which are received by the device 3, via the antenna 36 and the transceiver module 34, from one of the transceivers 2. Other functionality of the controller 30 of the mobile device 3 will be understood from the below description.

The controllers 10, 30 of the control apparatus 1 and the mobile device 3 each comprise at least one processor 10A, 30A. The at least one processor 10A, 30A may comprise one or more different types of data processing means, such as but not limited to processor and microprocessors. The controllers 10, 30 may also comprise one or more application-specific integrated circuits (ASICs) (not shown). The at least one non-transitory memory media 12, 32, which are coupled to their respective at least one processor 10A, 32A, may include any suitable type, or combination of suitable types, of volatile or non-volatile memory medium. Suitable types of memory medium include, but are not limited to ROM, RAM and flash memory. It will of course be understood that the controllers 10, 30 and memory media 12, 32 of the control apparatus 1 and the mobile device 3 may be different to one another. For example, the controller 30 of the mobile device 3 may include less data processing capacity than that of the control apparatus 1. Similarly, the storage capacity of the memory 32 of the mobile device 3 may be less than that of the control apparatus.

The at least one transceiver 2 of the data processing infrastructure 1, 2 and the transceiver module 34 of the mobile device 3 may be configured to transmit and receive BTLE data packets or messages. These BTLE messages may be of different types and may include advertising messages (ADV_IND). In the current BTLE specification, advertising messages may be transmitted on any of three different advertising channels. Typically, advertising messages are used to indicate the presence of a BTLE-capable device or apparatus to another BTLE-capable device or apparatus. Advertising messages may include an identifier, which identifies the transmitting device. In addition, an advertising message may include a channel identifier, which indicates to a receiving device or apparatus a different channel on which the transmitting device will transmit a subsequent message. The subsequent message may be referred to as a broadcast message. Advertising messages may be transmitted relatively infrequently compared to the frequency of transmission of the broadcast messages. For example, an advertising message may be transmitted every 1000 milliseconds and a broadcast message may be transmitted every 20 milliseconds. In this way, a transmitting device or apparatus is able to indicate its presence to a receiving device or apparatus on one of the advertising channels and then can transmit the data of interest using a broadcasting message on a different channel. This helps to avoid congestion of the three advertising channels.

The advertising message may also include a parameter, which may be referred to as a transmission interval parameter. The transmission interval parameter may indicate to the receiver the frequency with which broadcast messages will be transmitted. Put another way, the transmission interval parameter may indicate a time interval between transmissions of successive messages. This enables the receiving device/apparatus to determine how often broadcast messages are to be transmitted.

The transmitting device may also be configured to implement a delay to the scheduled transmission time. As such, the broadcast messages are actually transmitted after a slight delay from the scheduled transmission time. The magnitude of the delay is selected randomly or pseudo-randomly from a range between zero milliseconds and a pre-defined maximum delay. The actual delay may be determined by the Link Layer of the transmitting device. In the BTLE standard, the maximum delay is currently 10 ms. This delay, which may also be referred to as "jitter", is intended to reduce the likelihood of persistent collisions of messages sent by plural uncoordinated, independent devices.

Despite the use of jitter, if there are a large number of devices within a particular space and/or if each of the devices is required to transmit very frequently, collisions may still occur. As such, example embodiments described herein are configured to reduce the occurrence of message collisions.

Figure 3:
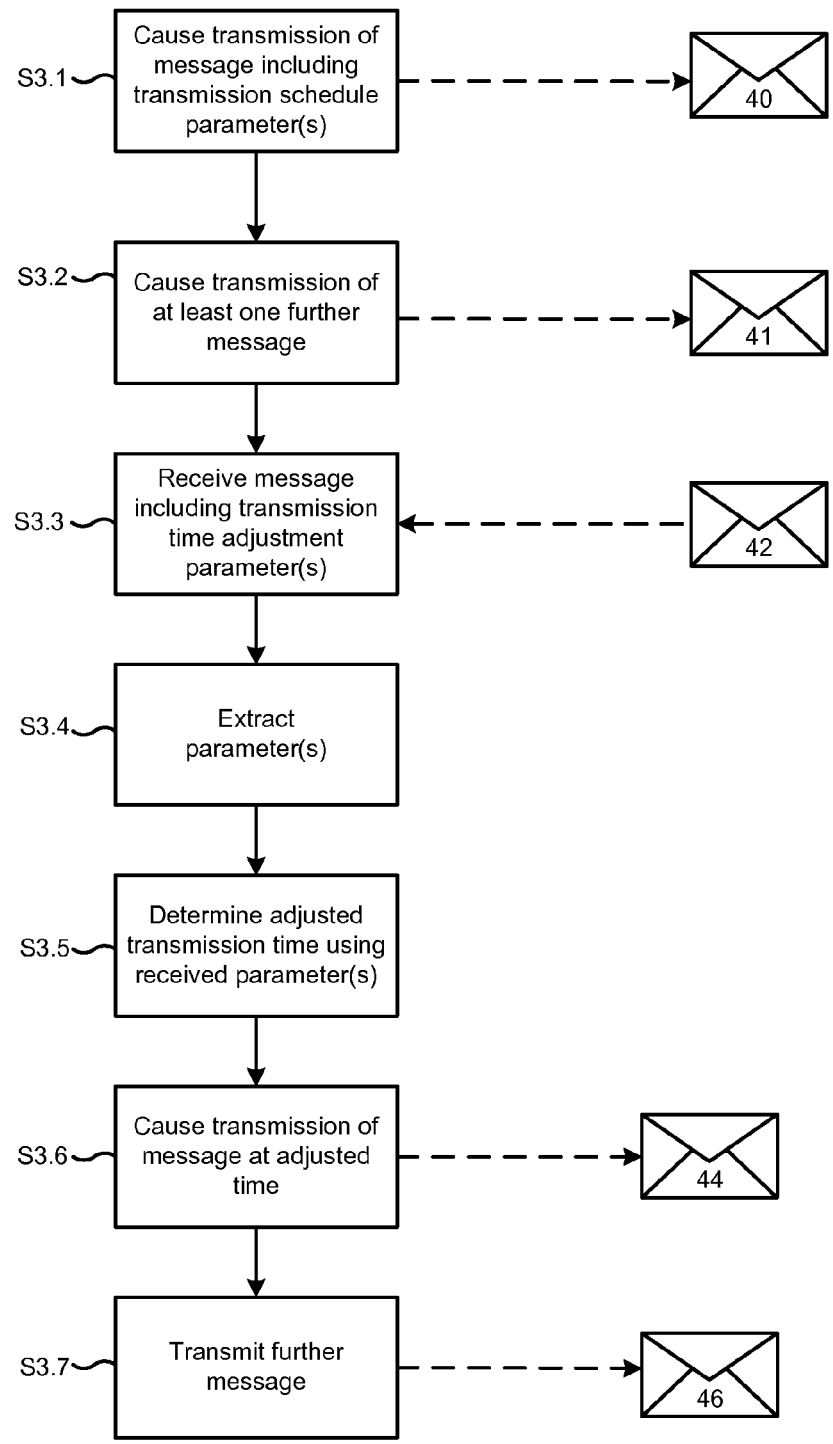
FIG. 3 is a flow chart illustrating an example method which may be performed by computing apparatus within the device of FIG. 2.
Figure 4:
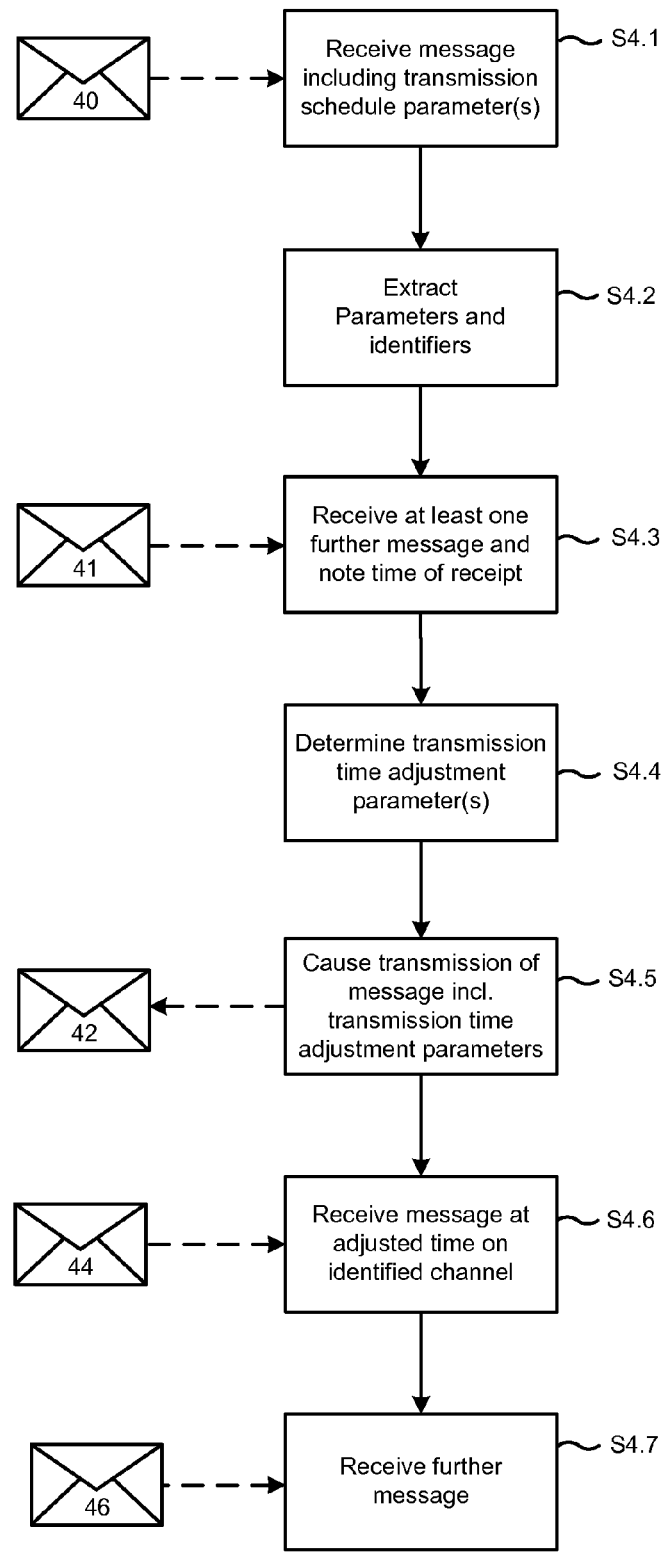
FIG. 4 is a flow chart illustrating an example method which may be performed by computing apparatus during communication with the tag of FIG. 2.

FIG. 3 is a flow chart illustrating operations which may be performed by the mobile device 3 of FIG. 2. FIG. 4 is a flow chart illustrating operations which may be performed by the data processing infrastructure 1, 2 of FIG. 1. These two flow charts will be described in parallel. The dotted arrows indicate the transfer of messages between the mobile device 3 and the data processing infrastructure 1, 2. In step S3-1, the controller 30 causes transmission of a BTLE message 40 via the transceiver module 34. The transmitted BTLE message 40 may be an advertising message which is transmitted on one of the BTLE advertising channels. The controller 30 includes in the advertising message 40 an identifier for identifying the mobile device 3. The advertising message 40 may also include the channel identifier for identifying a channel upon which a subsequent message (e.g. a broadcast message) will be transmitted. In some examples, the controller 30 may also include in the advertising message 40 one or more of the transmission interval parameter for indicating the regularity at which broadcast transmissions will be transmitted, a maximum delay parameter for indicating the maximum delay (or jitter) which may be applied to the subsequent transmission, and an advertising frequency parameter for indicating how often advertising messages will be transmitted.

Subsequently, in step S4-1 of FIG. 4, the transmitted advertising message 40 is received by one or more of the transceivers 2 of the data processing infrastructure 1, 2.

Next, in step 4-2, the controller 10 of the control apparatus 1 extracts from the received advertising message 40 the parameters and/or identifiers which are included in the advertising message 40. The controller 10 may then store the extracted parameters and/or identifiers in the memory 12.

Returning now to FIG. 3, in step S3-2, the controller 30 causes at least one further message 41 to be transmitted. This at least one further message may be a BTLE broadcast message 41 transmitted on the channel identified by the channel identifier. The at least one further message 41 may comprise a positioning packet for allowing the control apparatus 1 to determine a location of the device 3. After transmission of an advertising message 40, the device 3 waits for at least a pre-determined duration before transmitting the at least one further message 41. During the pre-determined duration, the device 3 "listens for" responses to the advertising message 40. As such, the predetermined duration may be referred to as a "listening window". A first one of the at least one further message may be transmitted at any time after expiry of the listening window. In some examples, the first of the broadcast messages 41 may be transmitted immediately after expiry of the listening window. Alternatively, if the transmission interval from a previously transmitted broadcast message has not expired when the listening window expires, the controller 30 may wait until expiry of the transmission interval before causing transmission of the first broadcast message 41. A subsequent one of the further messages is transmitted at a time that is defined by the transmission time of the first further message plus the transmission interval.

In step S4-3 of FIG. 4, the at least one further message 41 is received by the control apparatus 1. The controller 10 is configured to note a time at which at least the first of the further messages 41 is received. Based on this noted time and the transmission interval, the controller 10 is operable to determine when subsequent further messages 41 are expected to be received. As mentioned above, the transmission interval may be received as a transmission interval parameter from the device 3. Alternatively, the transmission interval may be pre-stored at the control apparatus 1. In other examples, the controller 10 may determine the transmission interval based on the times at which two consecutive further messages 41 are received.

Subsequently, in step S4-4, the controller 10 determines at least one transmission time adjustment parameter for transmission to the mobile device 3. The at least one transmission time adjustment parameter is for indicating to the mobile device 30 how the transmission time of at least one subsequent BTLE message transmission should be adjusted. The at least one transmission time adjustment parameter includes at least one of: a transmission schedule adjustment parameter, a transmission delay adjustment parameter, a transmission interval adjustment parameter and an adjusted transmission duration parameter.

The transmission schedule adjustment parameter indicates an adjusted time at which the subsequent message should be transmitted. This may indicate an offset by which the transmission time of subsequently transmitted messages should be adjusted. The transmission schedule adjustment parameter may include a sign (e.g. positive or negative) for allowing the mobile device 3 to determine in which direction in time the scheduled transmission time should be adjusted. For example, a negative offset may indicate to the mobile device 3 that the transmission should be brought forward and a positive offset may indicate that the transmission time should be delayed. In some examples, the offset direction may be defined in a separate parameter to the transmission schedule adjustment parameter. This separate parameter may be referred to as the transmission schedule adjustment direction parameter.

The transmission delay adjustment parameter indicates a maximum transmission delay (or "jitter") which may be applied by the mobile device 3. This may be more or less than the original maximum transmission delay, which the device 3 was originally configured to implement. The transmission delay adjustment parameter may be indicated in absolute terms or, in other examples, may be indicated as an offset relative to the original maximum transmission delay.

The transmission interval adjustment parameter indicates a frequency with which (i.e. how often) the device 3 should transmit subsequent BTLE messages. This may be indicated in absolute terms or relative to the original transmission interval. The original transmission interval may be pre-stored at the control apparatus 1, may be determined based on a transmission interval parameter received as part of the advertising message 40, or may be determined based on an interval between receipt of two consecutive further messages 41.

The adjusted transmission duration parameter indicates a duration for which the adjusted transmission times should be applied.

The control apparatus 1 is configured to determine the at least one transmission time adjustment parameter so as to reduce the number of collisions of messages transmitted concurrently by plural devices. In some examples, the control apparatus 1 may be configured to determine the at least one transmission time adjustment parameter so as to cause plural mobile devices to transmit their messages sequentially or, put another way, one after the other. In order to do this, the control apparatus 1 may be configured to receive at least one advertising message and at least one broadcast message from each of plural devices. Based on the time of receipt of the broadcast message and the transmission interval, the control apparatus 1 is able to determine when each of the devices is scheduled to transmit its broadcast messages. Based on this, the control apparatus 1 is able to determine at least one transmission time adjustment parameter for each device so as to cause the devices 3 to transmit broadcast messages in a sequential manner and thereby to reduce or avoid collisions. As will be appreciated, determining the transmission time adjustment parameters for each device 3 may require the control apparatus 1 to listen for advertising and broadcast messages for a relatively substantial duration, for example several seconds. As such, while the control apparatus 1 is listening for advertising and broadcast messages and determining the transmission time adjustment parameters, the broadcasting messages transmitted by the plural devices 3 may or may not be colliding with one another. However, following receipt of the transmission time adjustment parameters, each of the devices 3 adjusts the times of their broadcast message transmissions accordingly and the collisions are reduce or avoided. A more detailed discussion as to how plural mobile devices may be caused to transmit their broadcast messages sequentially is provided below with reference to FIG. 6.

In examples in which the control apparatus 1 controls the devices 3 to transmit sequentially, it may also control the devices 3 to reduce the delay or jitter that they apply to the transmissions of their messages. For example, although each device 3 may include an unavoidable, inherent level of jitter (e.g. caused by imperfections in the components etc), reducing the amount of delay that is intentionally applied by each device 3 allows the transmissions of the devices 3 to be arranged more compactly and so the control apparatus 1 is able to receive more messages in a given duration. This may be beneficial in implementations in which it is important to receive information, such as position information, as regularly as possible. Such implementations are described in more detail below.

In other examples, the control apparatus 1 may determine the transmission time adjustment parameters so as to increase the maximum transmission time delay that can be applied. In such embodiments, the control apparatus 1 may not cause the devices 3 to transmit their messages sequentially. As the actual delay that is applied is selected randomly or pseudo-randomly, increasing the maximum possible delay does not necessary prevent collisions, but instead reduces the likelihood that messages from two devices will collide repeatedly. As such, this improves the probability that at least some messages from each device 3 will be detected by the control apparatus 1, even though some messages may still be subject to collision. This may be useful in situations in which it is not necessary to receive messages from each device 3 particularly frequently, but in which it is necessary that a message from each device 3 is received by the control apparatus 1 at least every so often. Examples of such implementations are described below.

It will of course be appreciated that the timing of message transmissions may be controlled by the control apparatus 1 in other ways depending on the requirement of the particular implementation. For example, in some implementations it may be beneficial to receive transmissions from each device particularly frequently and this can be achieved using the transmission interval adjustment parameter. In some implementations, it may be beneficial that the adjusted transmissions (e.g. more frequent transmissions) last for only a predetermined time. In such implementations, the adjusted transmission duration parameter may be utilised to achieve this.

Returning now to FIG. 4, in step S4-5, the control apparatus 1 causes a BTLE message 42 to be transmitted to the mobile device 3. The message 42 includes the determined at least one transmission time adjustment parameter. The message 42 may be referred to as a transmission control message or a broadcast control message. The broadcast control message 42 for a particular device 3 may be transmitted on the channel on which the advertising message 40 was received. Put another way, the broadcast control message may be transmitted in response to the advertising message 40.

Subsequently, in step S3-3, the broadcast control message 42 is received at the device 3. In step S3-4, the processing apparatus 30, 32 extracts the at least one transmission time adjustment parameter from the message 42.

Next, in step S3-5, the processing apparatus 30, 32 determines an adjusted transmission time for at least one subsequent message based on the extracted at least one transmission time adjustment parameter. The operation of step S3-6 is discussed in more detail with respect to FIGS. 5A and 5B.

Next, in step S3-6, the processing apparatus 30, 32 causes a message 44 to be transmitted to at least one of the transceivers 2 at the adjusted transmission time. As discussed above, this message may be a BTLE broadcast message. In some examples, this broadcast message 44 comprises a positioning packet for allowing the control apparatus 1 or another computing apparatus in communication therewith to determine the location of the device 3.

In step S4-6 of FIG. 4, the control apparatus 1 receives the broadcast message 44 via at least one of the transceivers 2 on the channel identified in the advertising message 40. The control apparatus 1 may then extract the information from the message and act accordingly. As mentioned, in some embodiments, this may include determining the location of the device 3. In some examples, the control apparatus 1 may define the channel upon which broadcast messages should be transmitted by including in the broadcast control message 42 a channel adjustment identifier for identifying the required channel.

Returning now to FIG. 3, in step S3-7, the processing apparatus causes another BTLE broadcast message 46 to be transmitted at an adjusted time according to the transmission time adjustment parameters received in step S3-3. The adjusted transmission time of this second broadcast message 46 is determined based on at least one of: the transmission schedule adjustment parameter, the transmission interval adjustment parameter and the transmission delay adjustment parameter, depending on which of those parameters are included in the broadcast control message 42. If a transmission interval adjustment parameter was not present in the broadcast control message, the transmission time of the further broadcast message is determined using a predefined transmission interval parameter. Similarly, if no transmission delay adjustment parameter is received, the transmission time is determined using a predefined maximum transmission delay parameter, if one exists.

Further broadcast messages may be transmitted at the adjusted transmission times for a duration defined by the adjusted transmission duration parameter. Alternatively, if the adjusted transmission duration parameter was not present in the broadcast control message 42, further broadcast messages may be transmitted at the adjusted transmission times for a predefined duration or indefinitely until a user or system command is received by the device 3. In some examples, any further advertisement messages that are transmitted while the adjusted transmission is ongoing include adjusted parameters that are determined based on the received adjusted transmission time parameters.

In step S4-7, the control apparatus 1 receives the further broadcast message 46. The information therein may then be processed, for example, to determine the latest location of the transmitting device 3.

Figures 5A, 5B:
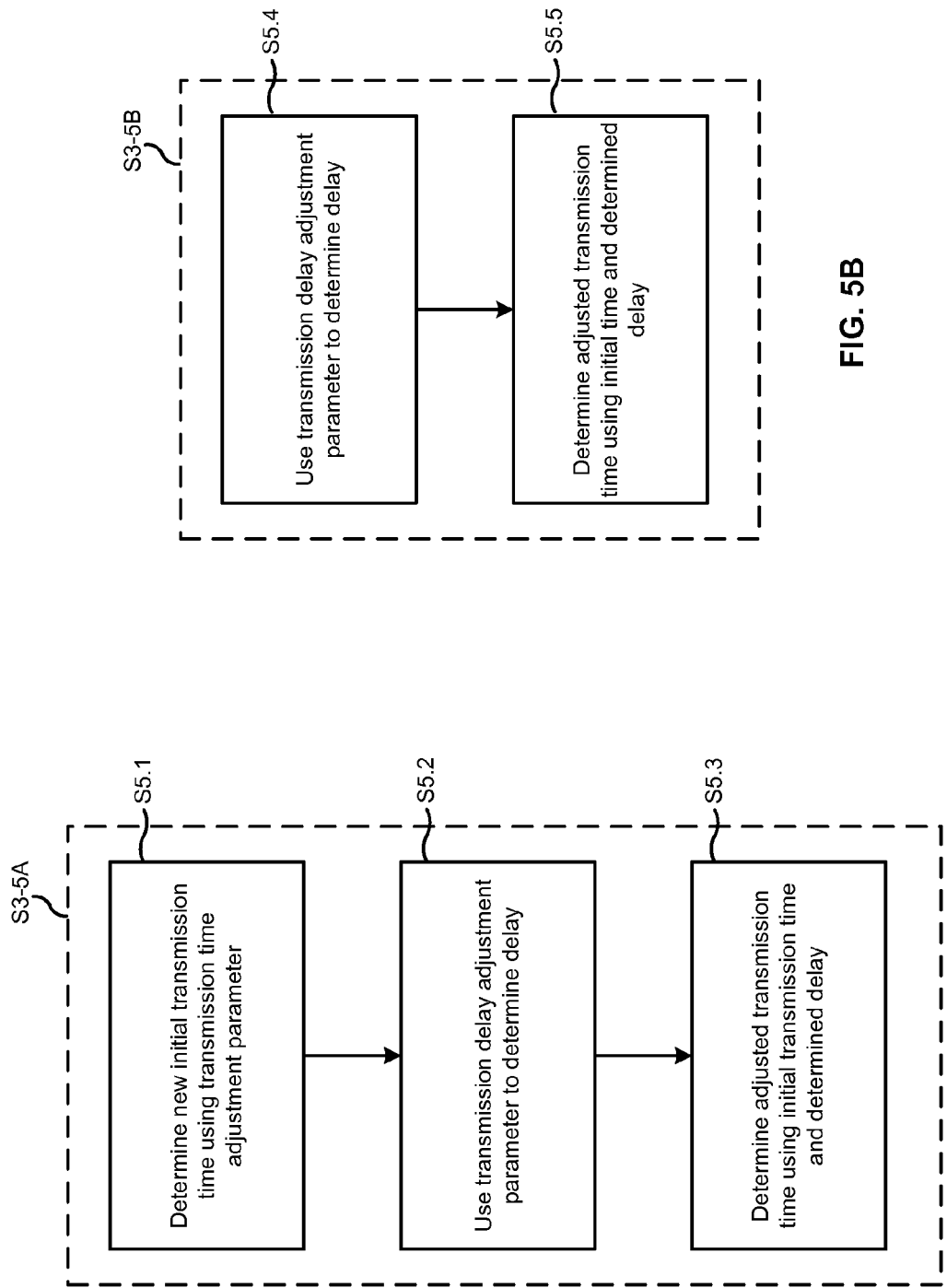
FIGS. 5A and 5B are flow charts illustrating in more detail examples of an operation from the flow chart of FIG. 3.

FIGS. 5A and 5B are examples of processes that may be performed by the processing apparatus 30, 32 of the mobile device when carrying out step S3-5.

FIG. 5A shows a first example of the processes (labelled collectively S3-5A) of which step S3-5 may be comprised. These processes may be performed when the broadcast control message 42 includes at least the transmission schedule adjustment parameter and the transmission delay adjustment parameter.

In step S5-1, the processing apparatus 30, 32 determines an initial adjusted transmission time using the scheduled transmission time of a subsequent broadcast message and the received transmission schedule adjustment parameter. For example, if a subsequent broadcast message is scheduled to be transmitted 100 ms after a reference time and the received transmission schedule parameter indicates a transmission schedule adjustment of +20 ms, the initial adjusted transmission time may be determined to be 120 ms (i.e. 100 ms+20 ms) after the reference time. The reference time may be the time at which the broadcast control message 42 is received. Later broadcast messages are then scheduled to be transmitted at a time that is equal to the initial adjusted transmission time plus the transmission interval multiplied by an integer. When a transmission interval adjustment parameter is received in the broadcast control message 42, later broadcast messages are scheduled to be transmitted at a time that is equal to the initial adjusted transmission time plus the adjusted transmission interval multiplied by an integer.

Next, subsequent to determining the initial adjusted transmission time, in step S5-2, the processing apparatus 30, 32 uses the received transmission delay adjustment parameter to determine a transmission delay for the broadcast message. If, for example, the transmission delay adjustment parameter indicates a maximum delay of 5 ms, the processing apparatus 30, 32 identifies a transmission delay between 0 ms and 5 ms in a random or pseudo-random manner. As an example, let us assume that a transmission delay of 2 ms is selected.

Subsequently, in step S5-3, the processing apparatus 30, 32 uses the initial adjusted transmission time and the identified delay to determine the adjusted transmission time for transmission of the subsequent broadcast message. In this example, if the initial adjusted transmission time is 120 ms and the identified delay is 2 ms, the actual adjusted transmission time is 122 ms.

FIG. 5B shows another example of the processes (labelled collectively S3-5B) of which step S3-5 may be comprised. These processes may be performed when the broadcast control message 42 includes a transmission delay adjustment parameter and not a transmission schedule adjustment parameter.

In step S5-4, the processing apparatus 30, 32 uses the received transmission delay adjustment parameter to select a transmission delay. If, for example, the transmission delay adjustment parameter indicates the adjusted maximum delay to be 50 ms, the processing apparatus 30, 32 selects in a random or pseudo-random manner a delay between 0 ms and 50 ms. Once selected, this delay is applied to the initial scheduled transmission time to determine the adjusted transmission time.

As mentioned above, example embodiments described herein may be utilised in a positioning system. In such examples, the transceivers 2 may be directional transceivers and the broadcast messages may comprise positioning packets. In one example implementation, a device 3 may be provided on the person of each of a plurality of athletes who are participating in a sporting event (for example, ice hockey or basketball). The positioning packets are used to track the movement of the athletes throughout the event. A device 3 may also be provided within the puck or ball. In such an event, there may be tens of devices being tracked. In addition, as the athletes are moving quickly, in order to obtain an accurate indication of an athlete's movement, it is important that positioning packets are received from each device 3 on a regular basis. Moreover, the nature of BTLE positioning is such that it may be beneficial to be able to average multiple sets of location data that are received in quick succession to determine a single position. In view of these requirements, it is beneficial to reduce message collisions as much as possible. Also, it may be beneficial for the devices 3 to transmit positioning packets very frequently. In such a scenario, the control apparatus 1 according to example embodiments may be configured to cause broadcast control messages 42 to be transmitted to each of the devices. The broadcast control messages 42 may include transmission schedule adjustment parameters so as to cause the devices to transmit their positioning packets sequentially. This may reduce or eliminate message collisions. In addition, the broadcast control messages 42 may include transmission delay adjustment parameters for minimising the amount delay that may be applied to each positioning packet. In this way the number of transmission which can be received by the positioning infrastructure 1, 2 within a predetermined duration can be increased. Also, the broadcast control messages 42 may include a transmission interval adjustment parameter for causing the frequency at which positioning packets are transmitted by each device to be increased. The control apparatus 1 may additionally include an adjusted transmission duration parameter in the broadcast control message 42 to cause adjusted transmission to continue for the duration of the sporting event.

Figure 6:
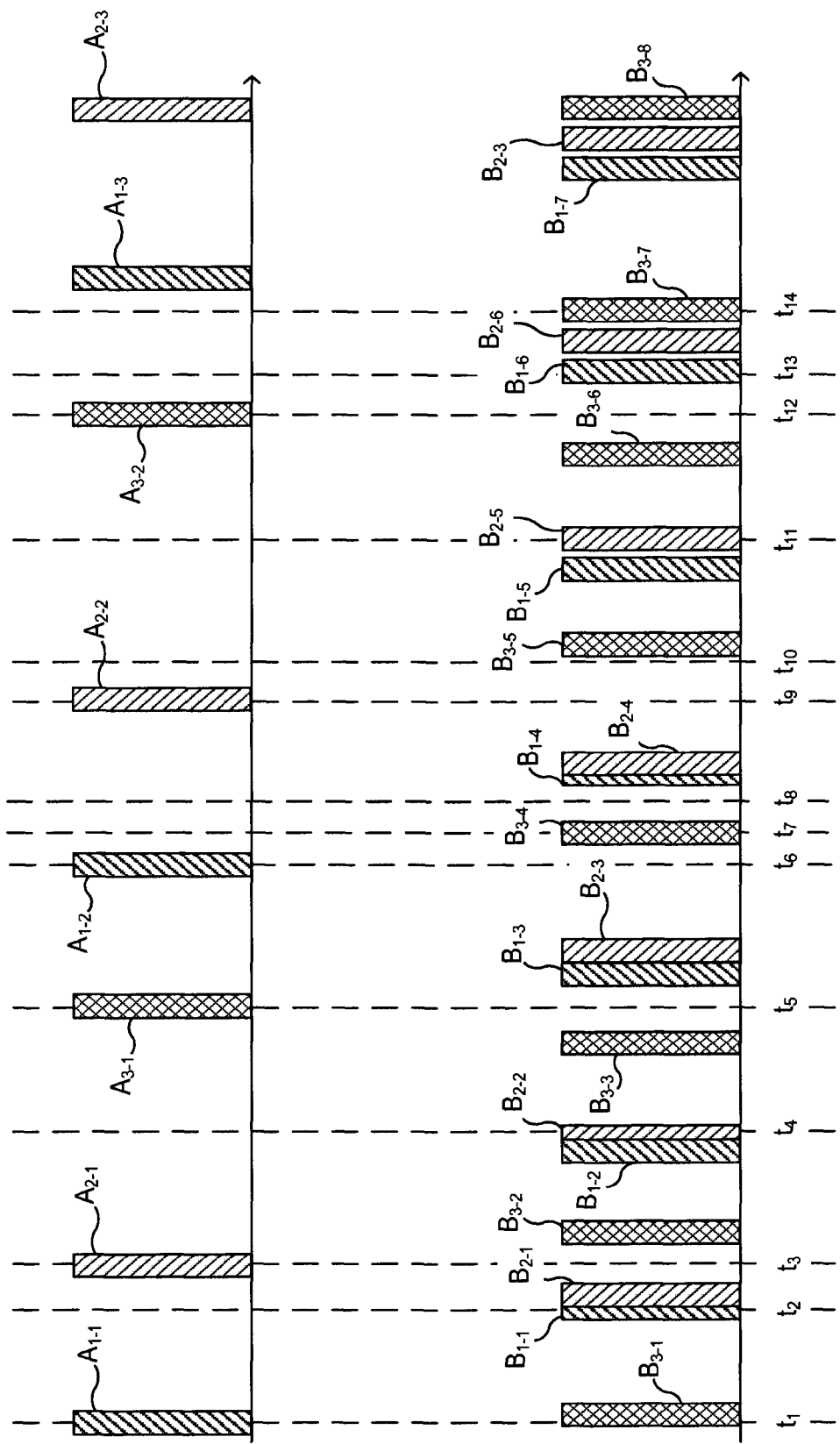
FIG. 6 is a diagram illustrating relative transmission times of messages by plural devices before and after receipt of transmission control messages.

FIG. 6 illustrates an example of a transmission sequence of broadcast messages transmitted by plural devices before and after receipt by each of the devices of broadcast control messages 42. In this example, broadcast control messages 42 cause the plural devices to transmit their broadcast messages sequentially, thereby reducing collisions between messages.

The Figure shows the relative transmission times of advertising messages (on the top row) and broadcast messages (on the bottom row) by three devices. The advertising messages transmitted by a first device are labelled A1-1 to A1-$n$, the advertising messages transmitted by a second device are labelled A2-1 to A2-$n$ and the advertising messages transmitted by a third device are labelled A3-1 to A3-$n$. The broadcast messages transmitted by the first device are labelled B1-1 to B1-$n$, the broadcast messages transmitted by the second device are labelled B2-1 to B2-$n$, and the broadcast messages transmitted by the third device are labelled B3-1 to B3-$n$.

As can be seen from the bottom row of FIG. 6, initially some of the broadcast messages from different devices collide with one another (for example, the first broadcast messages B1-1, B2-1 from the first and second devices). The use of jitter prevents the broadcast messages from the first and second devices colliding every time (see, for example, the third broadcast messages B1-3, B2-3 from the first and second devices). However, in certain situations, such as the sports event discussed above, it may be beneficial to substantially eliminate collisions between messages.

The following is an example of a way in which the control apparatus 1 determines transmission adjustment parameters based on messages received from three devices, and subsequently transmits them to the devices, thereby to reduce collisions. It will of course be appreciated that the relative timings shown in, and described with reference to, FIG. 6 are examples only.

First, at a time t1, the control apparatus 1 receives a first advertising message A1-1 from the first device on the advertising channel. In this example, the advertising message A1-1 (and indeed all advertising messages) includes a device identifier, a channel identifier identifying a channel on which broadcast messages are to be broadcast and a transmission interval parameter indicating an interval between transmissions of consecutive broadcast messages. The controller 10 then causes the apparatus 1 to listen for a first broadcast message B1-1 from the first device on the broadcast channel identified by the channel identifier. The first broadcast message B1-1 is subsequently received at time t2 and the controller 10 makes a record of this time.

Next, at time t3, the control apparatus 1 receives a first advertising message A2-1 from the second device. In response to this, the controller 10 listens on the broadcast channel (that was identified by the channel identifier) for the first broadcast message B2-1 from the second device. This is received at time t4, and the control apparatus 1 makes a record of this time. The control apparatus 1 now has knowledge of transmission times of the broadcast messages from the first and second devices. This knowledge is based on the transmission intervals received in the advertising messages A1-1, A2-1 and the noted times of receipt of the broadcast messages B1-1, B2-2. The controller 10 is thus able to recognise that broadcast messages from the first and second devices are likely to collide. The controller 10 is configured to generate a transmission schedule adjustment parameter for at least one of the first and second devices, thereby to substantially eliminate collision. The control apparatus 1 may not adjust the transmission times of the first device, but may instead use the transmission times of the broadcast messages B1-1 . . . B1-$n$ of the first device as a reference relative to which the transmission times of the other devices are adjusted. In other examples, transmission times of broadcast messages from all devices may be adjusted.

Subsequently, at time t5, the control apparatus 1 receives a first advertising message A3-1 from the third device. Subsequently, at a time t7, the control apparatus receives a broadcast message B3-4 from the third device. The controller 10 makes a record of this time. Based on this recorded time and the transmission interval received with the advertising message A3-1, the controller 10 now has knowledge of the transmission times of broadcast messages from the third device. Consequently, the controller 10 is now able to determine transmission time adjustment parameters for the third device so as to cause the third device to transmit its broadcast messages in sequence with the first and second devices.

At time t6, the control apparatus 1 receives a second advertising message A1-2 from the first device. The control apparatus 1 responds to the second advertising message A1-2 by transmitting a broadcast control message 42 to the first device, at a time t8, during the "listening window" of the first device. In this example, the broadcast control message 42 includes only a maximum delay adjustment parameter and not a transmission schedule adjustment parameter. The broadcast control message 42 does not include a transmission schedule adjustment parameter because the scheduled transmission times of the broadcast messages of the first device are being used as a reference for adjusting the transmission times of the broadcast messages of the other devices. In this example, the maximum transmission delay parameter is used to reduce the amount of jitter that can be applied by the first device when transmitting its broadcast messages.

At a time t9, the control apparatus 1 receives a second advertising message A2-2 from the second device. In response to this, at time t10, the control apparatus 1 transmits a broadcast control message 42 to the second device during the listening window of the second device. This message 42 includes a transmission schedule adjustment parameter for causing the second device to adjust its scheduled broadcast message transmission times, thereby to ensure that they do not collide with the broadcast messages transmitted by the first device. In addition, the broadcast control message 42 sent to the second device includes a maximum transmission delay parameter for reducing the amount of jitter applied by the second device.

In response to the broadcast control message 42, the second device adjusts the scheduled transmission of its next broadcast message B2-6 such that it does not collide with the broadcast message B1-6 transmitted by the first device. In this example, the transmission time of the broadcast message is moved back slightly (i.e. is transmitted slightly later than previously scheduled). The broadcast message B2-6 is transmitted at an adjusted time t11.

Subsequently, at time t12, the third device transmits a second advertising message A3-2. The control apparatus 1 responds to this by transmitting a broadcast control message 42 to the third device during the device's listening window at time t13. The broadcast control message 42 includes a transmission schedule adjustment parameter and a maximum delay adjustment parameter for reducing the amount of jitter that can be applied by the third device. The third device responds to this by adjusting the scheduled transmission time of its next broadcast message B3-7. In this example, the scheduled time is moved forward (i.e. the broadcast message is transmitted sooner than originally scheduled) to a time t14 shortly after the transmission by the second device of its broadcast message B2-6.

Subsequent to time t14, the broadcast messages continue to be transmitted at their sequential, adjusted times (see, for example, broadcast messages B1-7, B2-7 and B3-8).

It will thus be understood how example embodiments described herein are able to be utilised to reduce collisions of broadcast messages from plural devices. It will also be understood, however, that FIG. 6 is only an example for the purpose of illustrating this. As such, devices according to example embodiments may be controlled to avoid collisions in a different way to that described with reference to FIG. 6. For example, in FIG. 6, the transmission times of the broadcast messages (e.g. B3-6 and B3-7) from the third device are adjusted even though the originally scheduled times would not have collided with the broadcast messages from the first and second devices. In other examples, however, the control apparatus 1 may be configured to send a transmission schedule adjustment parameter to a device only if it is determined that there is a possibility that its broadcast messages will collide with those of other devices. In some examples, if the control apparatus 1 determines that there is no chance of the broadcast messages of a particular device colliding, the control apparatus 1 may not send a broadcast control message 42 to that device. Other variations to the operations described with reference to FIG. 6 will be apparent to the skilled person.

In another implementation of example embodiments, high value items or assets in a factory or warehouse may each be provided with a device 3 for transmitting BTLE positioning packets to a positioning infrastructure 1, 2. The requirements of this implementation are different to those of the sporting event described above. In this instance, there may be hundreds or thousands of items being tracked. However, the items may not be moving particularly quickly. As such, for this implementation, it may be sufficient to include a transmission delay adjustment parameter in the broadcast control message 42 for increasing the maximum transmission delay that may be applied by the devices 3. This ensures that positioning packets will be received from each device 3 at least once in while, even if collisions still occur. In addition a transmission interval adjustment parameter may be included in order to reduce the frequency with which positioning packets are transmitted. This may reduce the number of collisions and also reduce power expenditure. In this scenario, it may not be necessary to control the devices 3 to transmit positioning packets sequentially.

In some implementations, the assets being tracked may remain relatively static for part of the time and may move relatively quickly for part of the time. It may be desired to know their location when they are static and also to know their location accurately when they are moving around. Consequently, in some examples, the control apparatus 1 is operable to respond to a change in location, the location of the device 3 having been determined based on positioning packets received as broadcast messages. In some examples, the control apparatus may 1 be configured to respond to a determination that a rate of change of the location of the device has exceeded a certain threshold. In response to the determination, the control apparatus is configured to cause a broadcast control message 42 to be transmitted to the device. The broadcast control message includes at least one transmission time adjustment parameter. The at least one transmission time parameter may include a transmission interval adjustment parameter for controlling the rate at which broadcast messages are transmitted. Particularly, when it is determined that a normally static asset has started moving, the transmission interval adjustment parameter may cause the device 3 to increase rate at which broadcast messages, which include positioning packets, are transmitted. The transmission adjustment parameters may also include a transmission time adjustment parameter. This may be included, for example, because plural devices are determined to have started moving. In this way, the devices can be caused to transmit sequentially thereby reducing collisions and improving location-tracking accuracy. The transmission control message 42 may also include a transmission delay adjustment parameter or any of the other parameters described above. The control apparatus 1 may be configured, also or alternatively, to determine when a device has stopped moving, e.g. based on the rate of change of location of the device. In such examples, the control apparatus 1 may respond by causing a broadcast control message 42 to be transmitted to the device, for example to reduce the frequency at which the device transmits broadcast messages. An example of such an implementation is for example, the tracking of "go-karts" at a karting circuit. The karts are relatively expensive and so it may be desired to keep track of their location even when they are supposed to be stationary. In addition, when the karts are being driven it may be desirable to track their location as they travel around the circuit. Utilisation of the control apparatus to change the transmission parameters means it is not required to change the transmission mode manually each time the karts are to be driven or subsequently parked. In addition, by automatically reducing the rate of transmission of broadcast packets when a device is determined to have stopped moving for a predetermined duration, unnecessary energy expenditure can be avoided.

In many of the implementations described herein the devices 3 may be relatively simple, dedicated positioning devices, which may be referred to as "tags". However, it will be appreciated that in other examples the devices may be mobile devices of other types which are capable of operating using BTLE, such as but not limited to mobile telephones, tablet computers, laptop computers, music players, positioning devices.

Although the above-described example embodiments have been described primarily with reference to determining a position of a BTLE device, it will be appreciated that example embodiments may be used in other non-positioning situations. Some positioning or non-positioning embodiments may utilise transmission protocols other than BTLE, in which avoiding collisions of data packets may be beneficial.

Although not shown in the figures, in some examples, each advertising message 40 may include a parameter for indicating a transmission time of the subsequent broadcast message. Coupled with the channel identifier, this parameter enables the receiver to tune to the correct channel at the correct time in order to receive the subsequent broadcast message. This parameter may be referred to as a transmission schedule parameter. This may be in the form of a time offset which indicates to the receiver an interval between transmission of the advertising message and transmission of the subsequent broadcast message. By inclusion of this parameter the control apparatus may need to receive only the advertising message, and not also subsequent broadcast messages in order to determine the transmission times of the broadcast messages. In such examples, steps S3-3 and S4-3 may be omitted from the methods of FIGS. 3 and 4.

In examples in which the device 3 is configured ordinarily to apply jitter to its broadcast messages, it may be difficult for the processing apparatus 1 to determine accurately the transmission times of the broadcast messages based on the time of receipt of the first broadcast message. In such examples, the processing apparatus 1 may be configured to respond to the first advertising message 40 from the device 3 by transmitting a message (not shown in the Figures) which includes an instruction for the device 3 to discontinue the use of jitter. The device 3 responds to this message by transmitting a subsequent broadcast message 42 without the use of jitter. The processing apparatus 1 then uses the time of receipt of this subsequent broadcast message 42 to determine transmission times for all broadcast messages from that device 3. These are then used to determine the transmission time adjustment parameters for transmission to that device 3. The device 3 may be configured to respond to the instruction to discontinue the jitter by discontinuing the use of jitter within a predetermined duration. As such, the processing infrastructure 1 knows that any broadcast messages 42 that are received after expiry of the predetermined duration are transmitted without the use of jitter.

In other examples, the device 3 may be configured to include in its broadcast messages 42 an indication of the amount of jitter that is applied to that message. The processing apparatus 1 then uses the indicated amount of jitter to calculate the "un-jittered" transmission time. This may be performed by subtracting the indicated amount of jitter from the time of receipt of the broadcast message. The result of the calculation is the un-jittered transmission time, which the processing apparatus 1 uses to determine the unadjusted transmission times of subsequent broadcast messages. Based on the unadjusted times the processing apparatus 1 is able to determine the transmission time adjustment parameters for that device 3.

In yet other examples, the processing apparatus 1 apparatus may implement an iterative process for adjusting the transmission times of the broadcast messages. For example, the processing apparatus 1 may use the time of receipt of the first broadcast message 42 (which includes an unknown amount of jitter) to determine the transmission time adjustment parameters, but may then be configured to transmit one or more further transmission control messages 42 to fine tune the transmission times of the broadcast messages 46 of the device 3. This may occur, for example, because the processing apparatus 1 determines that collisions of messages between two devices are occurring even after the initial adjustment.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
receiving, at a first apparatus, a signal indicative of receipt of a first Bluetooth low energy control message, the first Bluetooth low energy control message including at least one transmission time adjustment parameter;
determining, at the first apparatus, an adjusted transmission time for a subsequent Bluetooth low energy message to be transmitted by the first apparatus based on the at least one transmission time adjustment parameter; and
causing transmission of the subsequent Bluetooth low energy message from the first apparatus at the adjusted transmission time,
wherein the at least one transmission time adjustment parameter comprises a transmission schedule adjustment parameter for indicating a duration by which the transmission time of the subsequent message should be adjusted from a scheduled transmission time.

2. The method of claim 1, comprising:
prior to receiving the first Bluetooth low energy message, causing transmission of a second Bluetooth low energy message, the second message indicating a channel over which the subsequent message is to be transmitted.

3. The method of claim 1, wherein determining the adjusted transmission time comprises adjusting the scheduled transmission time by the duration indicated by the transmission schedule adjustment parameter.

4. The method of claim 1, wherein the subsequent message comprises a positioning packet for allowing a position of a device, which transmits the subsequent message, to be determined.

5. The method of claim 1, wherein the adjusted transmission time is determined at least according to a random or pseudo-random selection based on the at least one transmission time adjustment parameter.

6. An apparatus comprising at least one processor and at least one non-transitory memory medium having computer-readable instructions stored thereon, the at least one non-transitory memory medium and the computer-readable instructions configured, with the at least one processor, to cause the apparatus at least:
to receive a signal indicative of receipt of a first Bluetooth low energy control message, the first Bluetooth low energy control message including at least one transmission time adjustment parameter;
to determine an adjusted transmission time for a subsequent Bluetooth low energy message to be transmitted by the apparatus based on the at least one transmission time adjustment parameter; and to cause transmission of the subsequent Bluetooth low energy message at the adjusted transmission time, wherein the at least one transmission time adjustment parameter comprises a transmission schedule adjustment parameter for indicating a duration by which the transmission time of the subsequent message should be adjusted from a scheduled transmission time.

7. The apparatus of claim 6, the at least one non-transitory memory medium and the computer-readable instructions being configured, with the at least one processor, to cause the apparatus:

prior to receiving the first Bluetooth low energy message, to cause transmission of a second Bluetooth low energy message, the second message indicating a channel over which the subsequent message is to be transmitted.

8. The apparatus of claim 6, wherein the at least one non-transitory memory medium and the computer-readable instructions are configured, with the at least one processor, to cause the apparatus to determine the adjusted transmission time by adjusting the scheduled transmission time by the duration indicated by the transmission schedule adjustment parameter.

9. The apparatus of claim 8, wherein the subsequent message comprises a positioning packet for allowing a position of a device, which transmits the subsequent message, to be determined.

10. The apparatus of claim 6, wherein the adjusted transmission time is determined at least according to a random or pseudo-random selection based on the at least one transmission time adjustment parameter.

11. The apparatus of claim 6, wherein the transmission schedule adjustment parameter comprises a sign for allowing the apparatus to determine in which direction the transmission time of the subsequent message should be adjusted.

12. An apparatus comprising at least one processor and at least one non-transitory memory medium having computer-readable instructions stored thereon, the at least one non-transitory memory medium and the computer-readable instructions configured, with the at least one processor, to cause the apparatus at least:

to determine at least one transmission time adjustment parameter;

to cause transmission of a first Bluetooth low energy control message including the at least one transmission time adjustment parameter, the at least one transmission time adjustment parameter being for allowing a recipient apparatus to determine an adjusted transmission time for a subsequent Bluetooth low energy message to be transmitted by the recipient apparatus; and to enable receipt of the subsequent message, the subsequent message having been transmitted by the recipient apparatus at the determined adjusted transmission time.

13. The apparatus of claim 12, the at least one non-transitory memory medium and the computer-readable instructions being configured, with the at least one processor, to cause the apparatus:

prior to determining the at least one transmission time adjustment parameter, to receive a second Bluetooth low energy message from the recipient apparatus; and to determine the at least one transmission time adjustment parameter based on a time of receipt of the second Bluetooth low energy message.

14. The apparatus of claim 12, the at least one non-transitory memory medium and the computer-readable instructions being configured, with the at least one processor, to cause the apparatus:

prior to determining the at least one transmission time adjustment parameter, to receive a third Bluetooth low energy message from the recipient apparatus; and to determine the at least one transmission time adjustment parameter based on a time of receipt of the second Bluetooth low energy message and on at least one of a time of receipt of the third Bluetooth low energy message and information included in the third Bluetooth low energy message.

* * * * *